(12) United States Patent
Mantell

(10) Patent No.: US 6,264,298 B1
(45) Date of Patent: Jul. 24, 2001

(54) HIGH FREQUENCY SHINGLED MULTIPLE DROP PER PIXEL INK OVERPRINTING METHOD

(75) Inventor: David A. Mantell, Rochester, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/126,155

(22) Filed: Jul. 30, 1998

Related U.S. Application Data

(63) Continuation-in-part of application No. 08/673,517, filed on Jul. 1, 1996.

(51) Int. Cl.$^7$ .......................................... B41J 2/205
(52) U.S. Cl. .................................. 347/15; 347/41
(58) Field of Search ................... 347/40, 41, 15, 347/12, 10

(56) References Cited

U.S. PATENT DOCUMENTS

| | | | |
|---|---|---|---|
| 4,692,773 | 9/1987 | Saito et al. | 347/15 |
| 4,967,203 | * 10/1990 | Doan et al. | 347/41 |
| 5,192,959 | 3/1993 | Drake et al. | 347/42 |
| 5,270,728 | 12/1993 | Lund et al. | 347/5 |
| 5,610,637 | * 3/1997 | Sekiya et al. | 347/15 X |

FOREIGN PATENT DOCUMENTS

| | | | |
|---|---|---|---|
| 0 159 402 | 10/1985 | (EP) | . |
| 0 259 541 A3 | * 3/1988 | (EP) | H04N/1/032 |
| 0 378 387 | 7/1990 | (EP) | . |
| 0 513 989 A2 | 11/1992 | (EP) | . |
| 0 623 473 A2 | 9/1994 | (EP) | . |
| 59-109375 | 6/1984 | (JP) | . |

* cited by examiner

Primary Examiner—David F. Yockey
(74) Attorney, Agent, or Firm—Tallam I. Nguti

(57) ABSTRACT

A method of printing an image on a recording medium with a liquid ink printhead moving in a scanning direction having drop ejectors depositing ink drops on a recording medium at a given default frequency and in a plurality of pixel locations spaced by a predetermined resolution, the method comprising the steps of (a) determining a pixel size drop volume of liquid ink necessary at the predetermined resolution to fill one of the pixel locations; (b) determining a reduced subpixel size drop volume of liquid ink for subpixel drops to be printed by dividing the pixel size drop volume by a factor of at least three; (c) determining a frequency for firing and printing the subpixel drops in a fast scan direction such that a succeeding subpixel drop lands on the recording medium before a preceding subpixel drop has completely spread, and so as to preserve throughput; and (d) firing and depositing multiple subpixel drops each having the determined reduced volume of liquid ink, at the determined frequency, and in a shingled overlapping manner in which adjacent subpixel drops overlap by at least one third the diameter of the overlapped subpixel drop, thereby resulting in synergistic slow scan direction combined spreading, and thereby enabling a relatively high number of gray scale levels, and high quality printed images.

8 Claims, 6 Drawing Sheets

HIGH FREQUENCY SHINGLED MULTIPLE DROP PER PIXEL INK OVERPRINTING METHOD

RELATED APPLICATIONS

This Application is a Continuation-In-Part of U.S. application Ser. No. 08/673,517 filed Jul. 1, 1996 and entitled "Liquid Ink Printing With Small Drop Overprinting", to David Mantell, and is related to U.S. application Ser. No. 08/781,365 filed Jan. 21, 1997 and entitled. "Checkerboard Printing For Multiple Drop Per Pixel Ink Jet Printing" filed Jan. 21, 1997 and to be abandoned.

FIELD OF THE INVENTION

This invention relates generally to method and apparatus for liquid ink printing and more particularly to liquid ink printing using small drop overprinting for gray scale printing.

BACKGROUND OF THE INVENTION

Liquid ink printers of the type frequently referred to as continuous stream or as drop-on-demand, such as piezoelectric, acoustic, phase change wax-based, or thermal, have at least one printhead from which droplets of liquid ink are directed towards a recording medium. Within the printhead, the ink is contained in a plurality of ink conduits or channels. Power pulses cause the droplets of ink to be expelled as required from orifices or nozzles at the ends of the channels.

In a thermal ink-jet printer, the power pulse is usually produced by a heater transducer or a resistor, typically associated with one of the channels. Each resistor is individually addressable to heat and vaporize ink in the channels. As voltage is applied across a selected resistor, a vapor bubble grows in the associated channel and initially bulges toward the channel orifice followed by collapse of the bubble. The ink within the channel then retracts and separates from the bulging ink thereby forming a droplet moving in a direction away from the channel orifice and towards the recording medium whereupon hitting the recording medium a dot or spot of ink is deposited. The channel is then refilled by capillary action, which, in turn, draws ink from a supply container of liquid ink.

The ink jet printhead may be incorporated into either a carriage type printer, a partial width array type printer, or a page-width type printer. The carriage type printer typically has a relatively small printhead containing the ink channels and nozzles. The printhead can be sealingly attached to a disposable ink supply cartridge and the combined printhead and cartridge assembly is attached to a carriage which is reciprocated to print one swath of information (equal to the length of a column of nozzles), at a time, on a stationary recording medium, such as paper or a transparency. After the swath is printed, the paper is stepped a distance equal to the height of the printed swath or a portion thereof, so that the next printed swath is contiguous or overlapping therewith. This procedure is repeated until the entire page is printed. In contrast, the page width printer includes a stationary printhead having a length sufficient to print across the width or length of the recording medium at a time. The recording medium is continually moved past the page width printhead in a direction substantially normal to the printhead length and at a constant or varying speed during the printing process. A page width ink-jet printer is described, for instance, in U.S. Pat. No. 5,192,959.

Printers typically print information received from an image output device such as a personal computer. Typically, this received information is in the form of a raster scan image such as a full page bitmap or in the form of an image written in a page description language. The raster scan image includes a series of scan lines consisting of bits representing pixel information in which each scan line contains information sufficient to print a single line of information across a page in a linear fashion. Printers can print bitmap information as received or can print an image written in the page description language once converted to a bitmap consisting of pixel information.

Bitmaps printed by a printer can be printed at the resolution of the received bitmap. The printer can also modify the received bitmap and print the information at-a resolution different than the one received. In either event, it is generally believed, under most circumstances, that the higher the resolution of the printed image, or the higher the perceived resolution of the printed image, the better that image will be received by one viewing the image. Consequently, most printer manufacturers strive to print higher resolution images by either producing printheads having more ink ejecting nozzles per inch or by artificially creating the appearance of higher resolution images with printing algorithms which manipulate or alter the received bitmap.

Various methods and apparatus for printing images with scanning carriage type liquid ink printers have been developed. The following references describe these and other methods and apparatus for liquid ink printing.

U.S. Pat. No. 5,270,728, to Lund et al., describes a method for multiplying the speed-resolution product of a raster scanning or imaging device such as an ink jet printer, and a resulting data structure. A 300 dots per inch (dpi) by 600 dpi logical pixel image is mapped to a corresponding, non-overlapping physical dot image. The printer's ink jets are fired responsive to the dot image to direct individual generally spherical ink droplets onto paper at 600 dpi resolution grid timing in order to effectively double the horizontal resolution of the printed pixel image.

European Patent Application Publication No. 623 473 to Holstun et al, describes increased print resolution in the carriage scan axis of an ink-jet printer. The increased print resolution is achieved by moving the carriage of an ink-jet cartridge in the carriage scan direction to provide a first resolution in that direction which is twice the second resolution in a print media advance direction. Two smaller drops of ink are fired onto each square pixel in a single pass of the cartridge so as to provide, for example, a 600 dpi resolution in the carriage scan axis with a 300 dpi resolution in the media advance direction.

Japanese Laid Open publication number 59-109375, laid open Jun. 25, 1984, describes a method to enable printing with a high-dot density wherein dot matrix patterns are printed while reducing the pitch in the scanning direction of a head when forwardly moving the head, and the patterns are printed in the same line by upwardly or downwardly staggering the printhead by one-half dot pitch when backwardly moving the head in a wire dot serial printer.

These conventional printing methods involve either printing overlapping drops at an overlap range that can be described as chain-overlapping, from their appearance, and usually because the degree of overlap is usually less than one third the diameter of the overlapped drop. Additionally, succeeding drops are printed at a frequency that does not take into account the spreading and drying time of the preceding drop, thus limiting drop spreading physics to the characteristics of one drop at a time. As a consequence, the number of gray scale levels that can be achieved with conventional printing is limited; and poor or limited lateral spreading is more likely to cause printed images to exhibit nozzle and printhead signatures, thus resulting in less than optimum image quality.

There is therefore a need for a printing method that overcomes these shortfalls and disadvantages of conventional multiple overlapping drop printing.

SUMMARY OF THE INVENTION

In accordance with one aspect of the present invention, there is provided a method of printing an image on a recording medium with a liquid ink printhead moving in a scanning direction having drop ejectors depositing ink drops on a recording medium at a given default frequency and in a plurality of pixel locations spaced by a predetermined resolution, the method comprising the steps of (a) determining a pixel size drop volume of liquid ink necessary at the predetermined resolution to fill one of the pixel locations; (b) determining a reduced subpixel size drop volume of liquid ink for subpixel drops to be printed by dividing the pixel size drop volume by a factor of at least three; (c) determining a frequency for firing and printing the subpixel drops in a fast scan direction such that a succeeding subpixel drop lands on the recording medium before a preceding subpixel drop has completely spread, and so as to preserve throughput; and (d) firing and depositing multiple subpixel drops each having the determined reduced volume of liquid ink, at the determined frequency, and in a shingled overlapping manner in which adjacent subpixel drops overlap by at least one third the diameter of the overlapped subpixel drop, thereby resulting in synergistic slow scan direction combined spreading, and thereby enabling a relatively high number of gray scale levels, and high quality printed images.

In accordance with another aspect of the present invention, there is provided a method of printing an image on a recording medium with a liquid ink printhead moving in a scanning direction having drop ejectors depositing ink drops on a recording medium at a given default frequency and in a plurality of pixel locations spaced by a predetermined resolution, the method comprising the steps of (a) determining a pixel size drop volume of liquid ink necessary at the predetermined resolution to fill one of the pixel locations; (b) determining a reduced subpixel size drop volume of liquid ink for subpixel drops to be printed by dividing the pixel size drop volume by a factor of at least three; (c) determining a frequency for firing and printing the subpixel drops in a fast scan direction such that a succeeding subpixel drop lands on the recording medium before a preceding subpixel drop has completely spread, and so as to preserve throughput; (d) firing and depositing in a first series of alternate pixel spaces on a first swath multiple subpixel drops each having the determined reduced volume of liquid ink, at the determined frequency, said multiple subpixel drops forming a cluster of shingled overlapping drops in which adjacent subpixel drops overlap by at least one third the diameter of individual drops, thereby resulting in synergistic slow scan direction combined spreading; and (e) firing and depositing in a second series of alternate pixel spaces complementary of the first series, and on a second swath, multiple subpixel drops each having the determined reduced volume of liquid ink, at the determined frequency, said multiple subpixel drops forming a cluster of shingled overlapping drops in which adjacent subpixel drops overlap by at least one third the diameter of individual drops, thereby resulting in synergistic slow scan direction combined spreading, and thereby enabling a relatively high number of gray scale levels, and high quality printed images.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
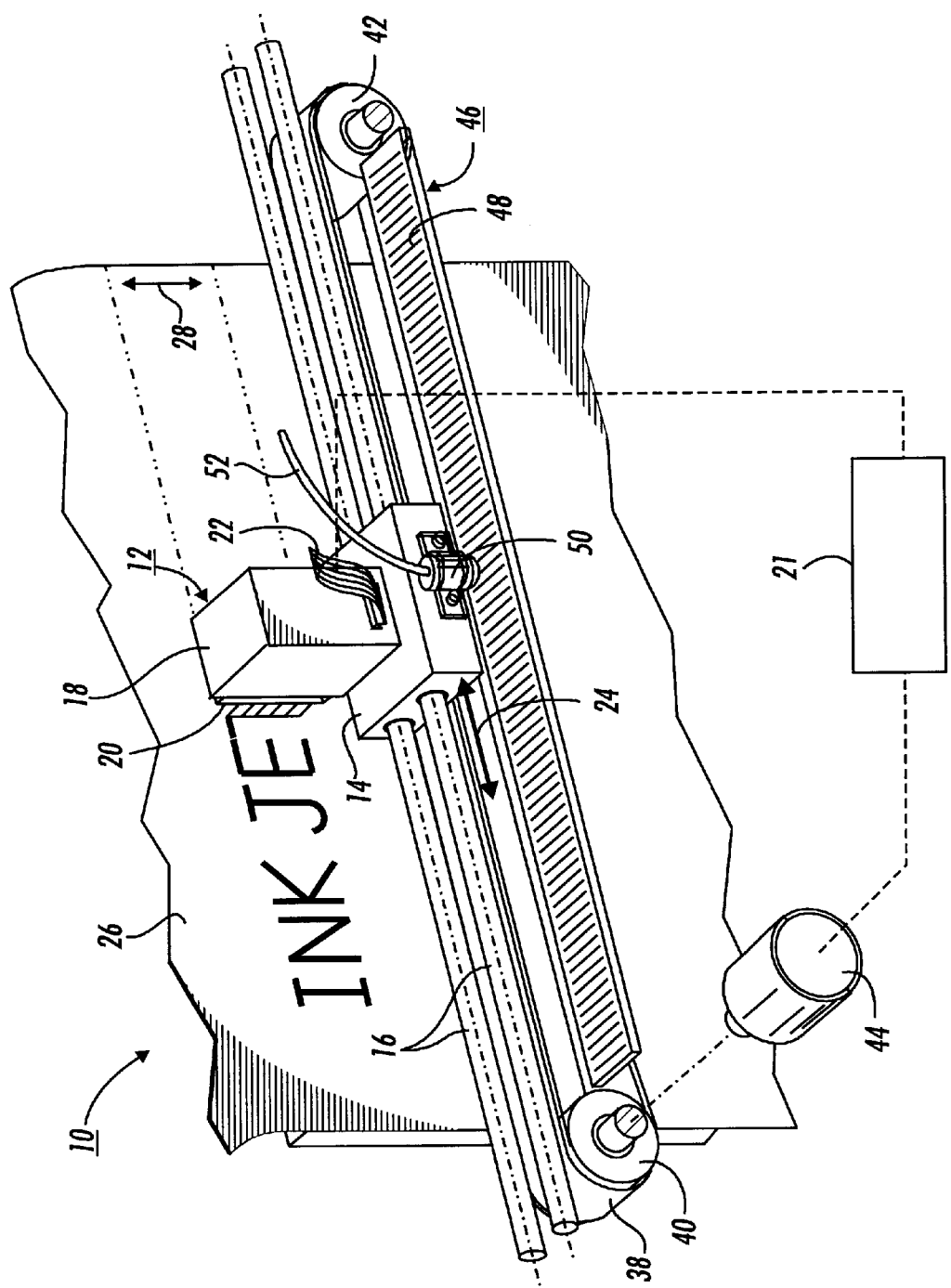
FIG. 1 is a partial schematic perspective view of an ink jet printer incorporating the present invention.

FIG. 1 illustrates a partial schematic perspective view of one type of liquid ink printer, an ink jet printer 10, having an ink jet printhead cartridge 12 mounted on a carriage 14 supported by carriage rails 16. The printhead cartridge 12 includes a housing 18 containing ink for supply to a thermal ink jet printhead 20 which selectively expels droplets of ink under control of electrical signals received from a controller 21 of the printer 10 through an electrical cable 22. The printhead 20 contains a plurality of ink conduits or channels (not shown) which carry ink from the housing 18 to respective ink ejectors, which eject ink through orifices or nozzles (also not shown). When printing, the carriage 14 reciprocates or scans back and forth along the carriage rails 16 in the directions of the arrow 24 at a constant speed. As the printhead cartridge 12 reciprocates back and forth across a recording medium 26, such as a sheet of paper or transparency, droplets of ink are expelled from selected ones of the printhead nozzles towards the sheet of paper 26. The ink ejecting orifices or nozzles are typically arranged in a linear array substantially perpendicular to the scanning direction 24. During each pass of the carriage 14, the recording medium 26 is held in a stationary position. At the end of each pass, however, the recording medium is advanced or stepped in a paper advance direction by a stepping mechanism under control of the printer controller 21 in the direction of an arrow 28. For a more detailed explanation of the printhead and printing thereby, refer to U.S. Pat. No. 4,571,599 and U.S. Pat. No. Reissue 32,572, the relevant portions of which are incorporated herein by reference.

It is well known and commonplace to program and execute imaging, printing, document, and/or paper handling control functions and logic with software instructions for conventional or general purpose microprocessors, such as the controller 21. This is taught by various prior patents and commercial products. Such programming or software may of course vary depending on the particular functions, software type, and microprocessor or other computer system utilized, but will be available to, or readily programmable without undue experimentation from, functional descriptions, such as those provided herein, or prior knowledge of functions which are conventional, together with general knowledge in the software and computer arts. That can include object oriented software development environments, such as C++. Alternatively, the disclosed system or method may be implemented partially or fully in hardware, using standard logic circuits or a single chip using VLSI designs.

The carriage 14 is moved back and forth in the scanning directions 24 by a belt 38 attached thereto. The belt 38 is driven by a first rotatable pulley 40 and a second rotatable pulley 42. The first rotatable pulley 40 is, in turn, driven by a reversible motor 44 under control of the controller 21 of the ink jet printer. In addition to the toothed belt/pulley system for causing the carriage to move, it is also possible to control the motion of the carriage by using a cable/capstan, lead screw or other mechanisms as known by those skilled in the art.

To control the movement and/or position of the carriage 14 along the carriage rails 16, the printer includes an encoder having an encoder strip 46 which includes a series of fiducial marks in a pattern 48. The pattern 48 is sensed by a sensor 50, such as a photodiode/light source attached to the printhead carriage 14. The sensor 50 includes a cable 52 which transmits electrical signals representing the sensed fiducial marks of the pattern 48 to the printer controller. Other known encoders, such as rotary encoders are also possible.

Figure 2:
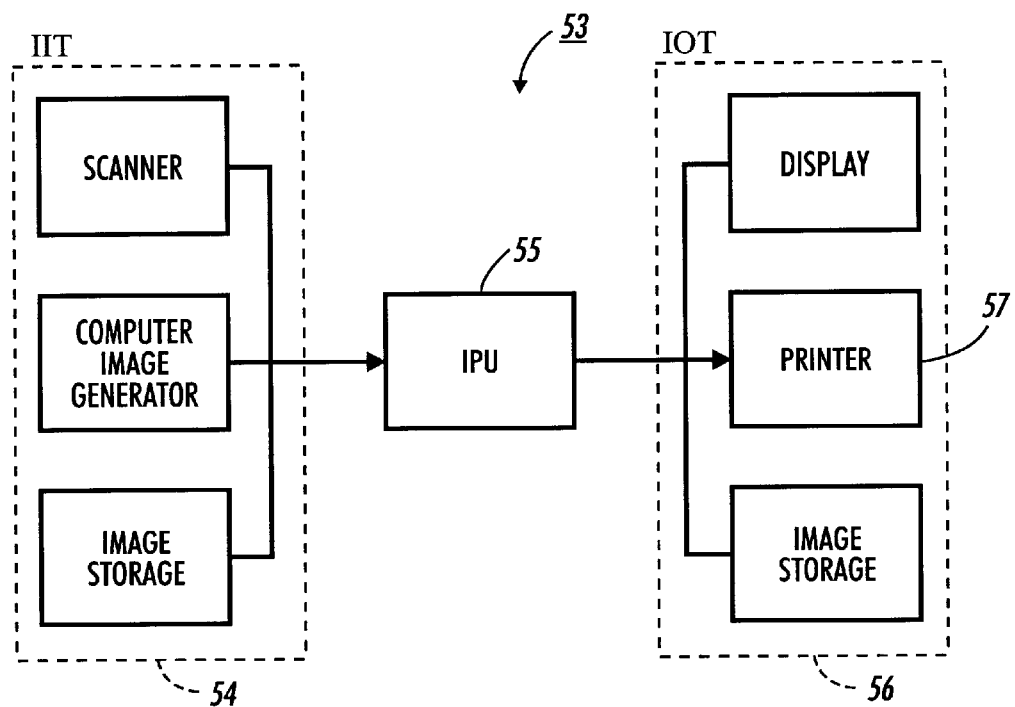
FIG. 2 illustrates a simplified schematic block diagram of an image producing system in which the present invention may be applied.

The ink jet printer 10 is included in a basic image processing system 53 of FIG. 2. In the system 53, an electronic representation of a document or image from an image input terminal 54 derives electronic digital data in some manner from an original image or other source, in a format related to the physical characteristics of the device typically including pixels. Typical image input terminals include a scanner, a computer image generator, such as a personal computer, and an image storage device. The electronic digital data signals, transmitted through an image processing unit 55 are processed for suitable reproduction on an image output terminal 56 which can include an image storage device, a printer 57, such as the printer 10, or a display. The printer 57 can include many types of printers including continuous stream printers or drop on demand printers including piezoelectric, acoustic, or phase change wax based, each of which includes a liquid ink printhead depositing liquid ink on a recording medium. Manipulation of the image data can occur in the image output terminal as well as in the image processing unit.

Figure 3:
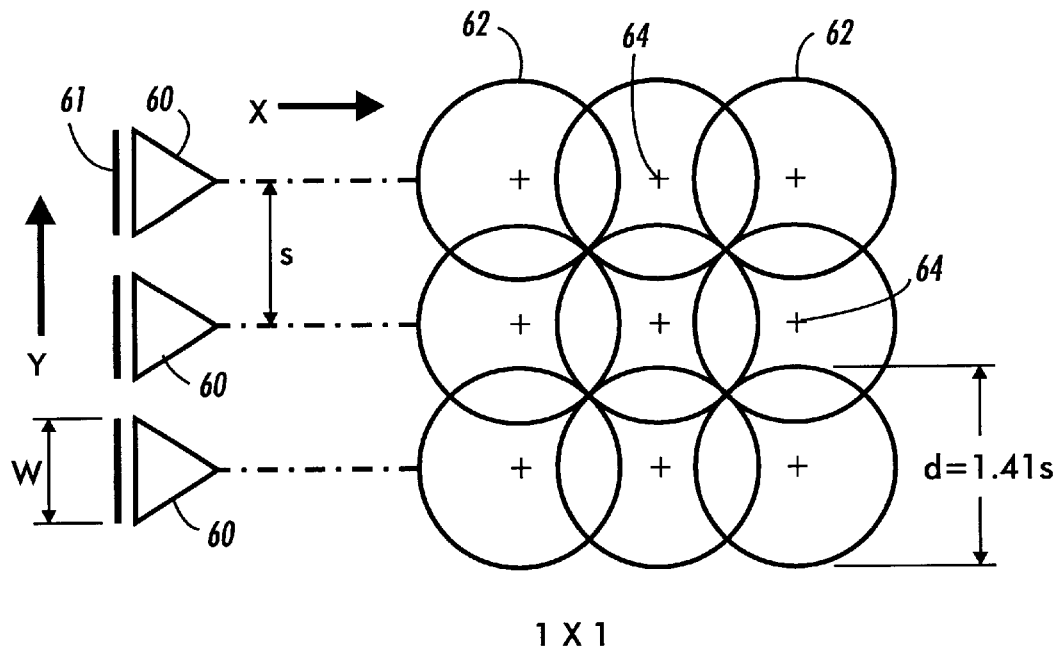
FIG. 3 illustrates the locations of ink drops deposited conventionally by a printhead 1 by 1 pattern.

FIG. 3 illustrates the locations of ink drops deposited by a printhead in a 1×1 pattern as known in the art. In such a printhead, for instance printing at 300 spots per inch, the pixels are placed on a square grid having a size S where S is generally the spacing between the marking transducers of the printhead as schematically illustrated. The nozzles 60, schematically represented as triangles, each associated with a single transducer 61, traverse across a recording medium in a scan direction X as illustrated. Other nozzle shapes are also possible such as those formed by isotropic etching, having rounded features, or by plasma etching, having angular or trapezoidal features. Acoustically generated ink drops generated by acoustic transducers are also possible. The marking transducers, which are spaced from one another a specified distance S, also known as the pitch, deposit ink spots or drops 62 on a grid defining a plurality of pixel areas at a predetermined resolution at a predetermined frequency, wherein ink spots deposited in the pixel areas each have a pixel centers 64 spaced a distance S apart. The ink nozzles 60 are designed to produce spot diameters of approximately 1.414 (the square root of 2) times the grid spacing S, which is here illustrated as the distance D. This distance provides complete filling of the pixel space by enabling diagonally adjacent pixels to touch. Consequently, in 1×1 printing (e.g., 300×300), the spots need to be at least 1.41 S to cover the paper. In practice however, the ink spots or pixel size drops are typically made slightly larger to ensure full coverage of the paper.

As illustrated in FIG. 3, this conventional printing method involves printing overlapping drops at an overlap range that can be described as chain-overlapping, from their appearance, because the degree of overlap is less than one third of the diameter of the overlapped drop. Additionally, succeeding drops are printed at a frequency that does not take into account the spreading and drying time of the preceding drop, thus limiting drop spreading physics to the characteristics of one drop at a time. As a consequence, the number of gray scale levels that can be achieved with such conventional printing is limited; and poor or limited lateral spreading is more likely to cause printed images to exhibit nozzle and printhead signatures, thus resulting in less than optimum image quality.

It is known in liquid ink printing that higher resolutions can be achieved by reducing the size of the ink drop and decreasing the drop ejector spacing on the printhead. This is known as high resolution binary printing. While high resolution binary printing provides improvements in gray scale printing, the scaling rules for creating increased resolution printheads increases the cost and complexity of the printhead since smaller heaters, channels, etc. are not easily fabricated especially when the spacing therebetween decreases.

Resolution can also be increased by doubling the amount of ink drops deposited in the scanning direction and advancing the recording medium in smaller steps. This method is also performed by using multiple passes of the printhead, typically greater than three and precisely advancing the recording medium by plus or minus one half a nozzle spacing in addition to multiples of such nozzle spacing. The large number of passes required greatly reduces the productivity of the printer. These types of increased resolution can suffer from the deposition of too much ink on the recording medium.

A second problem with high resolution binary printing is that the directionality or the accuracy of where the drop is placed on the recording medium plays a major role in the quality of the output image. If drops are misdirected when deposited on the paper, the quality gained from increased resolution printing can be lost. Consequently, even though higher resolution binary printing can improve the image resolution when compared to lower resolution binary printing, higher resolution binary printing is undesirable in many respects due to the increased complexity.

It is also possible to deposit two liquid ink drops in the carriage scan direction for every single drop in the paper advance direction thereby doubling the resolution in the carriage scan axis with respect to the paper advance direction. Such a method of doubling the resolution in the scan direction can be accomplished by depositing the drops in a single pass of the printhead or in two or more passes of the printhead. In either case, the resulting image appears essentially the same since two ink drops having a drop volume reduced by one-half are sufficient to completely cover the white space of a pixel area.

While each of these methods can improve printing resolution to some degree, each method is limited in the number of gray levels which can be reproduced since each method is still essentially a binary printing method. It has been found, however, that gray scale printing with liquid ink can be greatly improved by depositing a number of small ink drops unequally or equally spaced within a pixel space where each drop has a different drop center but which are clustered near the center of the pixel space. These drops are deposited in rapid succession within the pixel space such that ink of each drop mixes and spreads into a larger single drop. By selecting an ink having certain ink spreading properties, the overlapping ink drops spread a greater amount in the paper advance direction than in the carriage scan direction such that the spot size resulting from overlapping drops tends to approximate the size and shape of a single drop having the same amount of ink. Consequently, the present invention, known as overprinting, provides for increased gray scale resolution without the necessity of printing multiple drops on top of one another, which requires multiple passes, or without the necessity of making multiple passes with partial step recording medium advance, or increasing the resolution of the printheads.

Figure 4:
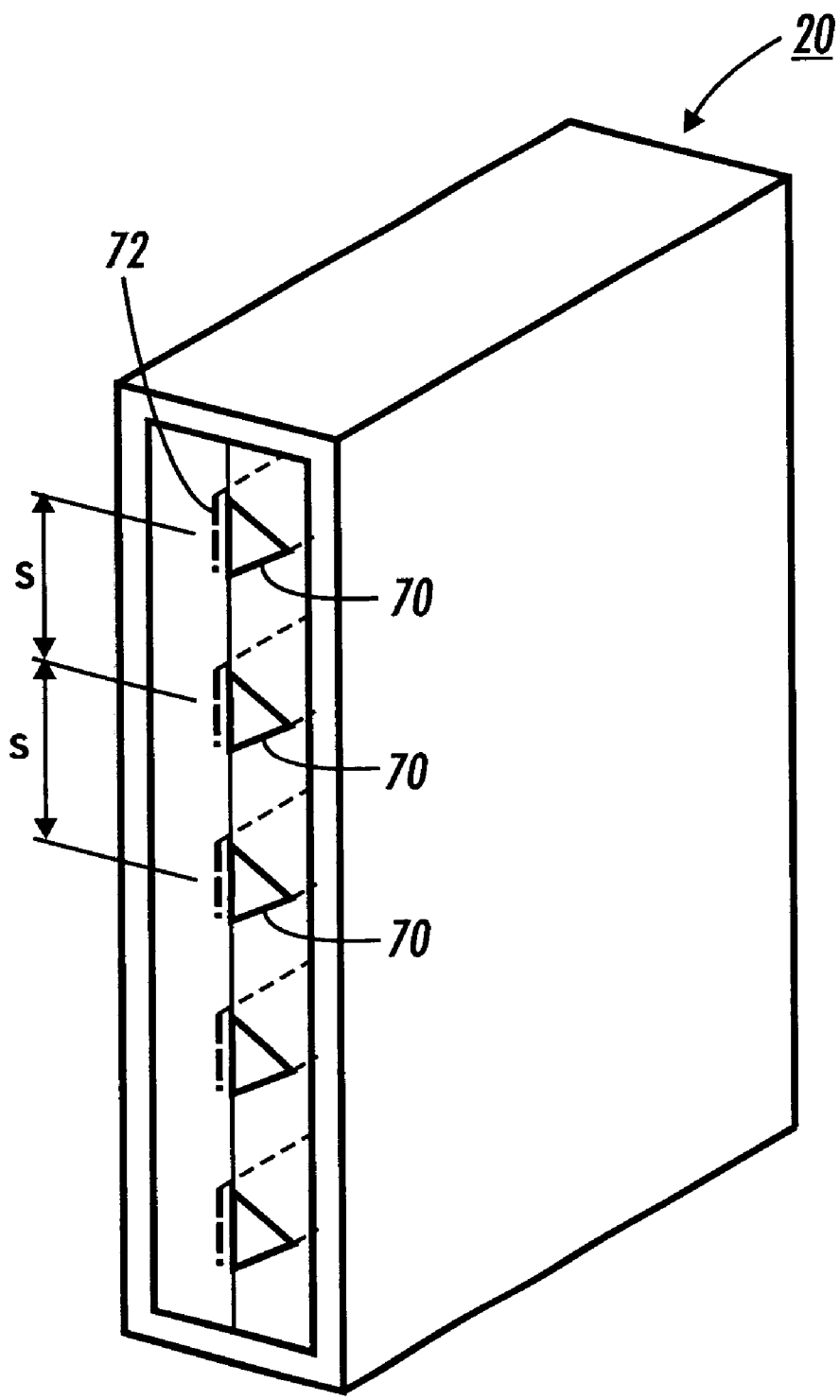
FIG 4 is a schematic perspective view of an ink jet print cartridge having an ink jet printhead with ink ejecting nozzles and associated heaters incorporating the present invention.

FIG. 4 illustrates the printhead 20 of the present invention which includes a plurality of nozzles 70 which are spaced a distance S which is equivalent to the spacing S of the nozzles described in FIG. 2 along the paper advance or non-scan direction. For instance, the spacing S could be 300 spots per inch in the paper advance direction. While the spacing S remains at 300 spots per inch the amount of ink deposited by each of the nozzles 70 is reduced by a factor n and the firing frequency is increased by a factor greater than n. Consequently, to achieve the desired overprinting of the present invention, the nozzle size of the nozzles 70 is reduced as well as the size of a heater 72 associated with each of the nozzles 70.

In determining the amount of ink necessary to be deposited by each nozzle 70 for overprinting, it is important to determine how much optical density, and therefore ink volume, is necessary to provide the same amount of ink coverage in known 300 by 300 resolution printing. It has been found that it takes approximately the same amount of ink or less to cover the page by printing successive small drops as for binary printing. Thus as long as the drop size can be decreased and the firing frequency increased, overprinting becomes a viable method for improving image quality without reducing the productivity of the printer. Smaller drop volumes also provide the additional benefit of faster refill time or recovery time for drop ejectors. The smaller drops also require less energy per drop thereby enabling more drop ejectors to be energized simultaneously. Reducing the spot size improves image quality regardless of whether it is reduced from 300 spots per inch to a 600 spot per inch spot size still spaced at 300 spots per inch or to some intermediate spot size. The lightest gray level and the spacing between gray levels is determined by the spot size. Consequently, the described invention can provide significant improvements in gray scale.

In accordance with the present invention, again, high frequency, shingled multiple drops overprinting with synergistic slow scan direction spreading as illustrated in FIGS. 5B, 5D, and 6–7D works by reducing the size or volume of each drop of multiple subpixel drops fired within a pixel size space. The subpixel drops, according to this method of shingling or shingle-overlapping of subpixel drops in a cluster or grouping, are printed at a frequency of at least one kHz, and such that the subpixel drops overlap by one third or more, preferably one half or more, the diameter of each subpixel drop. Shingle overlapping is achieved by spacing apart the centers of adjacent subpixel drops in a cluster such that if each of the adjacent drops were to spread independently of the other, their diameters will overlap by at least one third, and preferably one half. Preferably the subpixel drops in a cluster are fired sequentially at an increased frequency or ejection rate in the order of 18 kHz or more so that each succeeding subpixel drop 76 of a grouping of such drops is fired and arrives on the paper before the preceding drop has completely spread, and in order to preserve printing throughput. Because adjacent subpixel drops in a grouping have a large amount of overlap, typically one-third or more, and preferably one half or more, and because they are fired at such a rapid or high frequency, it has been found that the grouping of such subpixel drops results in a synergistic slow scan direction spread that is far greater than would be achieved if the subpixel drops overlapped by less than one third, and were fired at lower frequencies.

Figure 5A:
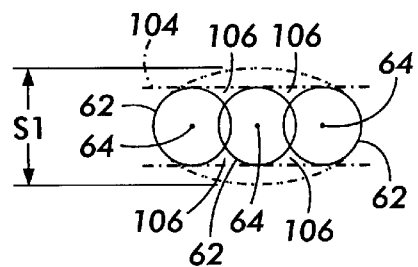
FIG. 5A is an illustration of conventionally deposited chain-overlapping subpixel drops showing conventional large uncovered lap regions between the drops.

FIG. 5A is an illustration of three subpixel drops 62 conventionally deposited in a chain-overlapping manner, that is over-lapping by less than one third the diameter of the over-lapped drop showing conventional large ink uncovered lap regions 106 between the drops 62. As shown, each drop 62 has a center 64 that is aligned with that of the other drop 62, and the ink uncovered regions 106 are defined by a common tangent 104 to both drops. These large ink uncovered regions 106 have to be covered with ink spreading from the drops 62, and it is believed that the ink used to cover the regions 106, takes away from, or limits how far the ink from the two drops 62 can spread in the slow scan direction. As such, the maximum lateral or slow scan direction spread will have only a dimension shown as S1.

Figure 5B:
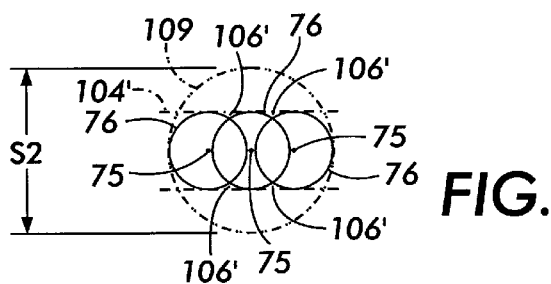
FIG. 5B is an illustration of shingle-overlapping subpixel drops deposited in accordance with the present invention showing an advantageously and relatively small uncovered lap regions between the drops.

On the other hand, FIG. 5B illustrates three subpixel drops 76 deposited in a shingle-overlapping manner in accordance with the present invention and showing advantageous and relatively small ink uncovered lap regions 106' between the drops 76. As shown, each drop 76 has a center 75 that is aligned with that of the other drop 76, and the ink uncovered regions 106' are defined by a common tangent 104' to both drops. These relatively small ink uncovered regions 106' also have to be covered with ink spreading from the drops 76, and it is believed that the comparatively small amount of ink required to cover the regions 106' leaves more ink from the three drops 76 that adds to the synergistic spreading of the three drops 76 in the slow scan direction in accordance with the present invention as shown by the comparatively greater dimension S2. The resulting spread and dried drop or ink spot 109 illustrates the synergistic advantage of the present invention. In fact, it has been found that the greater the overlap (one third or greater) the smaller the ink uncovered region 106'.

Figure 5C:
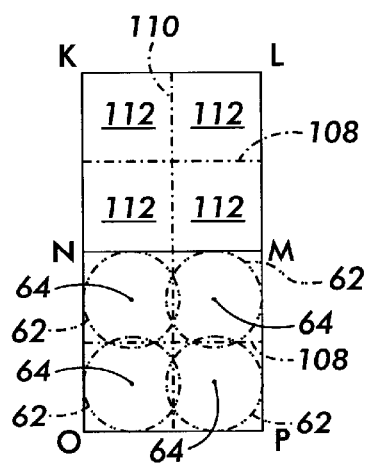
FIG. 5C illustrates conventional chain-overlapping subpixel drops each printed centered within a subpixel location away from the pixel location scan direction axis.

FIG. 5C illustrates two pixel locations KLMN and MNOP, each of which for example is subdivided into four subpixel locations each shown as 112. Each pixel location KLMN, MNOP has a scan direction axis 108, and a slow scan direction axis 110. Within each subpixel location of the pixel location MNOP, one of 4 chain-overlapping subpixel drops 62 is shown deposited conventionally. As such, the center 64 of each subpixel drop 62 is centered within its subpixel location, and away from the scan direction axis 108 of the pixel location MNOP. This type of conventionally printing with the centers of drops (pixel or subpixel drops) centered as above, makes it very difficult to achieve higher resolution printing and the shingle-overlapping technique of the present invention.

Figure 5D:
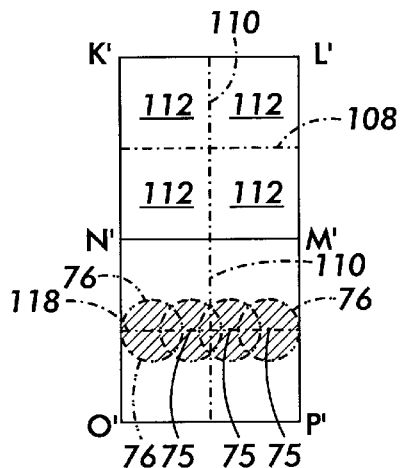
FIG. 5D illustrates shingle-overlapping subpixel drops each printed centered on the location scan direction axis, and away from centers of the subpixel locations.

However, in accordance with the present invention, as shown in FIG. 5D, two pixel locations K'L'M'N' and M'N'O'P' are also illustrated, each of which for example is subdivided into four subpixel locations 112. Each pixel location K'L'M'N' and M'N'O'P' has a scan direction axis 108, and a slow scan direction axis 110. Within each subpixel location of the pixel location M'N'O'P', one of 4 shingle-overlapping subpixel drops 76 is shown deposited in accordance with the present invention. Accordingly, the center 75 of each subpixel drop 76 is centered on the scan direction axis 108 of the pixel location M'N'O'P'. Such shingle-overlapping printing with the centers of drops (pixel or subpixel drops) centered on the scan direction axis 108, makes it very possible to achieve high resolution printing and the shingle, or greater than one third, (preferably than one half) diameter overlapping according to the present invention.

Since in shingled multiple drops overprinting the subpixel drops are deposited in rapid succession on the same pass of a printhead by the same nozzle 70, the amount of time between depositing adjacent shingle-overlapping such drops is less than the amount of time necessary for one such drop to completely spread. This aspect of the present invention can be improved by careful selection of ink properties. For example, the ink selected can be, but preferably should not be a slow drying ink where very little or no ink spreading occurs, and can be, but preferably should not be a fast drying ink where the ink spreads unrestrictedly along paper fibers such that drops are irregularly shaped and optical density is greatly reduced. A medium drying ink falling between the extremes of slow drying ink and fast drying ink balances the properties of spreading and drying time such that enough spreading occurs to closely approximate the size and shape of a single drop. Enough spreading also occurs to fill in any gaps between adjacent overlapping drops in the paper advance direction when the drops are printed on the same pass. Ink spreading can also be assisted with the application of energy to the recording medium, including heat, radiation, such as microwave, or pressure.

The advantages of printing with subpixel drops shingle-overlapped and at the stated high frequency range in accordance with the present invention include (a) greater synergistic lateral spread than if the same size subpixel drops are printed at a lower frequency on subsequent passes for example, or with a less than one third overlap; (b) a higher correlation between drops because they are fired in one pass by the same nozzle so that there is more consistent area coverage for the final spot or combined spread and dried drop; (c) because a next drop is fired and arrives on the sheet before the preceding drop has had time to completely spread;, the surface tension of the still liquid drops causes them to spread as one drop; and (d) yet each subpixel drop is small enough to enable high resolution printing, and hence leading to a better quality image.

Where the minimum time span required for a drop of ink, for example, a subpixel size drop of ink, to spread and dry is about 1 msec., then a feasible frequency for firing subpixel drops in accordance with this invention is any frequency higher than 1 kHz (equivalent to less than 1 msec. between fired drops). So this eliminates any option of printing such overlapping drops on different passes. Preferably, in order to preserve printer throughput where fired drops are reduced subpixel drops, a frequency range for the present invention is 18 kHz or greater, the actual number depending on the number of subpixel drops created from a pixel size drop.

Figure 6:
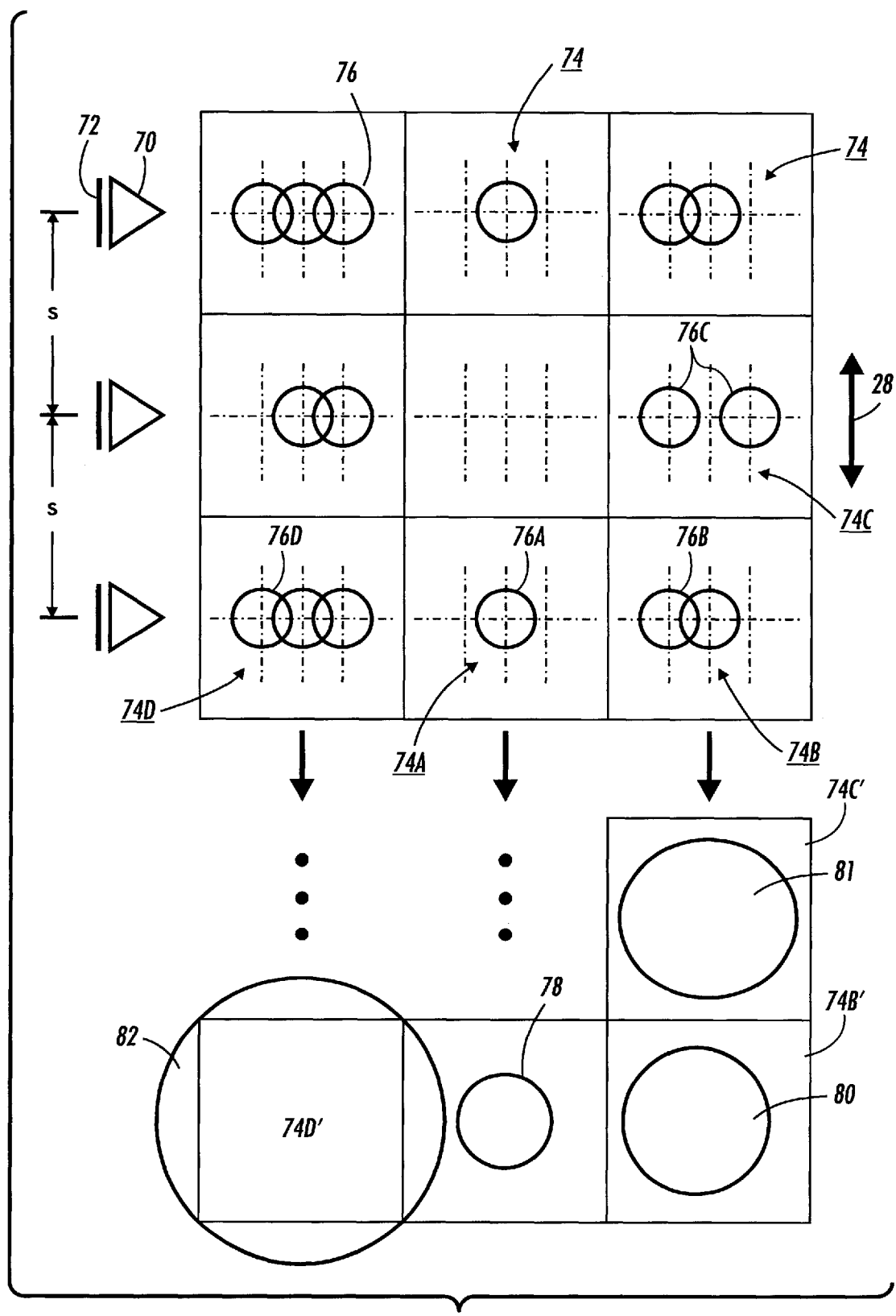
FIG. 6 illustrate the locations of ink drops deposited by the printer of the present invention with small drop overprinting.

FIG. 6 illustrates a printing example using three subpixel drops for illustrative purposes of the printhead illustrated in FIG. 4. Using the printhead of FIG. 4, overprinting is accomplished by printing within each pixel drop location 74 in an addressability grid of 300 spot per inch, a grouping of subpixel drops 76. In FIG. 6, three times overprinting or shingle overlapping printing is accomplished by reducing a size or volume of a drop sufficient to adequately cover a pixel drop location 74 by approximately a factor of three such that each subpixel drop is about one third the size or volume of the pixel drop, and by increasing the frequency for firing such subpixel drops by a factor of more than three. An acceptable controller for printing by reducing drop size and varying reduced drop firing frequency is described for example in U.S. Pat. No. 5,300,968 to Hawkins, herein incorporated by reference. In each of the pixel drop locations 74, a grouping of subpixel drops 76 fired and overprinted can vary from zero to three, for example. The fact that zero up to and including three subpixel drops 76 can be deposited within a pixel drop location 74 advantageously allows for an increased gray scale resolution having a possibility of four or more gray levels per pixel.

Where more than one subpixel drop is to be fired or overprinted within a pixel space, the present invention also contemplates depositing two adjacent subpixel drops such that their centers are spaced apart a distance that is less than one-half of the scanning direction length of a pixel spacing. This method of printing can be achieved in the ink jet printer of the present invention by depositing subpixel drops simultaneously in groups within each pixel space, and by using groups of drop ejectors 70 to each deposit the subpixel drops sequentially. In addition, all drop ejectors 70 of the moving printhead must each deposit the their subpixel drops in less time than it takes to move the printhead a distance equal to the scanning direction length of a single pixel space. It is also possible to select a maximum number of subpixel drops to be deposited within a pixel space or location 74, where the actual number of subpixel drops is different from pixel location to pixel location. In such cases one pixel location can include a maximum of two subpixel drops having their drop centers spaced a first distance apart, and another pixel location can include a maximum of three subpixel drops having drop centers spaced a second distance apart which can be different from the first distance.

Still referring to FIG. 6, it has been found that spreading of liquid ink pixel or subpixel drops overprinted in accordance with the method of the present invention, occurs not only in the fast scan direction along which the drops are being fired and spaced, but spreading also occurs to a synergistic or greater degree or extent in the paper advance or slow scan direction 28. Because of this synergistic slow scan direction spreading phenomenon, printing in accordance with the present invention does not require subpixel drops do to be deposited directly on top of one another in order to achieve a relatively circular drop size. Instead adjacent subpixel drops can be deposited side by side with their drop centers spaced apart. Such synergistic slow scan direction spreading occurs because at the high subpixel drop firing frequency of more than 18 kHz of the present invention, which is greater than conventional printing frequencies, each succeeding subpixel drop 76 of a grouping of such drops is fired and arrives on the paper before the preceding drop has completely spread.

For instance, the pixel location 74A having one ink subpixel drop 76A deposited therein is illustrated below it as a spread and dried ink drop 78. As illustrated, the dried drop 78 has a size that is slightly larger than the initially deposited subpixel drop 76A, but it is significantly less than what is required to cover the rectangular pixel space or location 74A' due to the initial reduction in drop size or volume from that of a pixel size ink drop. The pixel location 74B on the other hand is shown having two subpixel drops 76B deposited along the axis of pixel location in the scan direction such that a combined spread and dried drop 80 formed thereby has a size as illustrated that is greater than the drop 78 from a single such drop. The resulting drop 80 has synergistically spread in the paper advance or slow scan direction more so than in the scanning direction. As a result, the size of the drop 80 has and exhibits a fairly circular appearance, but it is still significantly less than the pixel space or location 74B'.

Likewise, in the pixel drop location 74C including two subpixel drops 76C separated by an unprinted subpixel space, the two separated drops 76C result in a combined spread and dried drop 81 having a size larger than either that of the drop 78 or the drop 80. The drop 81 however comes closer than those 78, 80, to filling the pixel space or location 74C'. Lastly, in the pixel drop location or space 74D including three subpixel drops 76D fired at a frequency of 18 kHz or more and shingle-overlapped by one third or more, and preferably one half or more in accordance with the present invention, the drops 76D combine and synergistically spread in the slow scan direction, resulting in a combined spread and dried drop 82. Advantageously, the drop 82 as illustrated has spread so that it has a nice circumferential shape, and more than fills, and in fact spreads beyond the rectangular pixel space or location 74D'. One important advantage of shingle overlapping printing in accordance with the present invention is that the subpixel drops are printed sequentially from the same nozzle in a single pass. As such, the correlation of the positions at which such drops land on paper is much greater, and thus more controllable and predictable than if such drops were printed conventionally on different subsequent passes, and with different nozzles.

In reality, a number of gray levels that can be achieved with high frequency shingle-overlapped overprinting in accordance with the present invention can be greater than four since, for instance, the pixel location 74B could include two subpixel drops 76B that are separated by one open subpixel space, thereby providing an ink density different than that from two subpixel drops which are deposited overlapping or merely side by side. As can be seen, the subpixel drops 76D are deposited centered on the fast scan direction axis from which they can spread synergistically according to the present invention.

While the illustration shows the spacing between drop centers being regularly spaced, it is understood that the drops centers may be irregularly spaced due to inherent fluctuations in drop positioning. Predetermined irregular spacing of the drops is also within the scope of the invention, as well, as is irregular spacing that may result from the printer and/or printhead design. Such a design will be intended for depositing drops at an irregular spacing by determining a range of drop ejection frequencies such that drops are placed at a rate faster than the rate of spreading of ink on the recording medium.

For the case of two sequential drops there are two possibilities, the one shown in pixel location 74C centered, and another one non-centered in which the two rightmost subpixels or leftmost subpixels instead are printed. It can provide additional image quality benefits when taking into account the neighboring pixels. Such effects include smoothing edges of shapes or letters as well as controlling the grayscale through the white space between the spots.

Figure 7A:
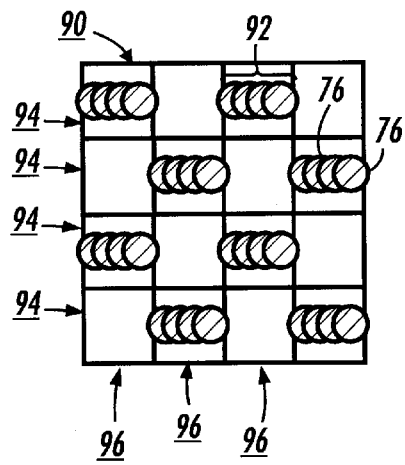
FIGS. 7A and B illustrate the locations of ink drops deposited, in a first swath, b a printer incorporating the present invention of small drop overprinting in a checkboard configuration.

FIG. 7A illustrates an example of high addressability checkerboard printing using shingle-overlapping multiple subpixel drop overprinting in accordance with the present invention, for gray scale rendition. As illustrated, the printhead 20 (FIG. 4) deposits, in a first swath 90, a plurality of subpixel drop clusters 92 along rows 94 in alternate columns 96. These drop clusters 92 are illustrated as fired, and before any synergistic slow scan direction spreading can occur in accordance with the present invention. Each of the drop clusters 92 includes a plurality of subpixel drops 76, which in this example is four. As can be seen every other column 96 within a row includes an ink drop cluster 92, and every other row within a column contains an ink drop cluster 92 such that ink clusters 92 do not appear in adjacent pixel locations within a row, and also do not appear within adjacent pixel locations within a column, thereby forming a "checkerboard" pattern.

Figure 7B:
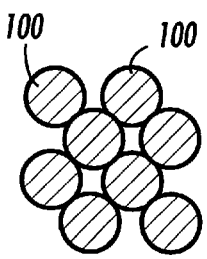
FIGS. 7C and D illustrate the locations of ink drops deposited in a second swath by a printer incorporating the present invention of small drop overprinting in a checkerboard configuration complementary to the configuration of FIGS. 6A and B.

In FIG. 7B, the subpixel ink drops 76 of the ink drop clusters 92 of FIG. 7A have had time to synergistically spread according to the teachings described herein, such that resulting ink drops 100 fully cover each pixel location and actually, touch one another along a diagonal axis as illustrated, but not along a row 94 or a column 96. By printing in this fashion, the shingle-overlapping multiple subpixel drop overprinting of the present invention allows for ink spreading where desired, that is within a single pixel location to gain advantage of the described ink spreading phenomenon for multilevel gray scale printing, but prevents ink spreading among adjacent pixel locations such that discrete unprinted pixel locations are not contaminated by the ink of an adjacent printed pixel location.

Figure 7C:
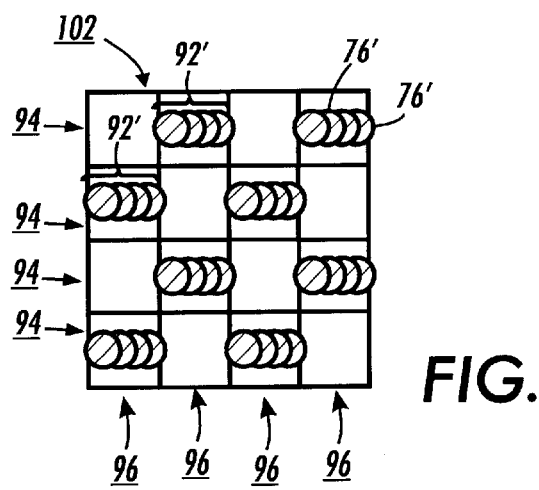
Figure 7D:
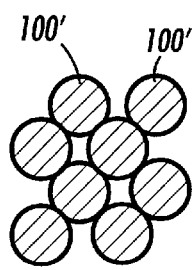

Once the first swath is printed and allowed to spread and dry, as illustrated in FIGS. 6A, 6B, a second swath 102 is printed as illustrated in FIGS. 6C and 6D. The second swath 102, is illustrated without the spread and dried drops of the first swath so that the locations of the drop clusters 92' can be more easily discerned. As illustrated in FIG. 7C, every other pixel location in a column and every other pixel location in a row has deposited thereon a drop cluster 92'. The pixel locations of the second swath 102 are, however, complementary to the pixel locations of the first swath 90 such that after the ink of the clusters 92' spreads to form the drops 100', as illustrated in FIG. 7D, full ink coverage would be achieved because the ink drops 100 of the first swath 90 and those 100' of the second swath 102 would overlap. Though the spread and dried drops or spots 100, 100' in figures in 6B and 6D are circular they could in fact retain some oblong character and still satisfy the requirement that all space is filled by the two passes. It is understood that such checkerboard printing can also be done in two or more passes.

While full coverage printing has been illustrated in FIGS. 6A–D, this is only an illustrative example and any drop coverage is possible from no drops within a pixel location up to and including N drops where N is selected to equal the maximum number of drops necessary for complete pixel space coverage. In addition, while two pass printing has been illustrated, multiple pass printing is also possible where the number of passes is two or greater.

In recapitulation, there has been described an apparatus and method for liquid ink printing using small drop overprinting for gray scale printing. It is, therefore, apparent that there has been provided in accordance with the present invention, an apparatus and invention that fully satisfies the aims and advantages hereinbefore setforth. While this invention has been described in conjunction with a specific embodiment thereof, thermal ink jet printing, it is evident that many alternatively, modifications, and variations will be apparent to those skilled in the art. For instance, the present invention is not limited to thermal ink jet printing but includes all types of printing where liquid ink drops are deposited on a recording medium or an intermediate including but not limited to acoustic ink jet printing as well as phase change wax based printing. For instance, in wax based printing where the ink is deposited on an intermediate and the recording medium is then brought into contact and pressed against the deposited ink and the intermediate, spreading occurs during the pressing step. In addition, the present invention is not limited to monochrome printing but also includes color printing as well.

While the present invention has been described with respect to three times drop overprinting, the present invention is not limited to three times drop overprinting but can include two or more times drop overprinting. Accordingly, the present invention is intended to embrace all such alternatives, modifications and variations that fall within the spirit and broad scope of the appended claims.

What is claimed is:

1. A method of printing an image on a recording medium with a liquid ink printhead moving in a scanning direction having drop ejectors depositing ink drops on the recording medium at a given default frequency and in a plurality of pixel locations spaced by a predetermined resolution, the method comprising the steps of:

(a) determining a pixel size drop volume of liquid ink necessary at the predetermined resolution to fill one of the pixel locations;

(b) determining a reduced subpixel size drop volume of liquid ink for subpixel drops to be printed by dividing the pixel size drop volume by a factor of at least three;

(c) determining a frequency for firing and printing the subpixel drops in a fast scan direction such that after printing a given subpixel drop, a succeeding subpixel drop lands on the recording medium before; and (d) firing and depositing multiple subpixel drops each having the determined reduced volume of liquid ink, at the determined frequency, and in a shingled overlapping manner in which adjacent subpixel drops overlap by at least one third of a diameter of an overlapped subpixel drop, thereby resulting in a synergistic slow scan direction combined spreading, and thereby enabling a relatively high number of gray scale levels, and high quality printed images.

2. The method of claim 1, wherein said adjacent subpixel drops overlap by at least one half the diameter of an overlapped subpixel drop.

3. The method of claim 1, wherein said step of determining a frequency comprises determining a frequency greater than 18 kHz so that after printing a given subpixel drop, a succeeding subpixel drop lands on the recording medium before the given subpixel drop has completely spread, and so as to preserve printing throughput.

4. The method of claim 1, wherein said firing and depositing step comprises depositing at least three subpixel drops having centers on a fast scan direction axis of a pixel space being printed on, so as to benefit from the synergistic spreading in the slow scan direction.

5. The method of claim 1, including determining a frequency equal to at least three times the given default frequency and corresponding to a number of times by which the pixel size drop volume is reduced to arrive at the reduced subpixel drop volume.

6. The method of claim 1, wherein said firing and depositing step comprises depositing at least three subpixel drops having their centers on a fast scan direction axis, and clustered toward a center of the pixel space.

7. A method of printing an image on a recording medium with a liquid ink printhead moving in a scanning direction having drop ejectors depositing ink drops on the recording medium at a given default frequency and in a plurality of pixel locations spaced by a predetermined resolution, the method comprising the steps of:

(a) determining a pixel size drop volume of liquid ink necessary at the predetermined resolution to fill one of the pixel locations;

(b) determining a reduced subpixel size drop volume of liquid ink for subpixel drops to be printed by dividing the pixel size drop volume by a factor of at least three;

(c) determining a high frequency greater than 18 kHz for firing and printing subpixel drops in a fast scan direction such that after printiong a given subpixel drop, a succeeding subpixel drop lands on the recording medium before the given subpixel drop has completely spread, and so as to preserve throughput;

(d) firing and depositing in a first series of alternate pixel spaces on a first swath multiple subpixel drops each having the determined reduced volume of liquid ink, at the determined high frequency, said multiple subpixel drops forming a cluster of shingled overlapping drops in which adjacent subpixel drops overlap by at least one third the diameter of the overlapped subpixel drop, thereby resulting in a synergistic slow scan direction combined spreading; and (e) firing and depositing in a second series of alternate pixel spaces complementary of the first series, and on a second swath, multiple subpixel drops each having the determined reduced volume of liquid ink, at the determined high frequency, said multiple subpixel drops forming a cluster of shingled overlapping drops in which adjacent subpixel drops overlap by at least one third the diameter of the overlapped subpixel drop, thereby resulting in a synergistic slow scan direction combined spreading, and thereby enabling a relatively high number of gray scale levels, and high quality printed images.

8. The method of claim 7, wherein said firing and printing steps comprise firing and printing different numbers of subpixel drops in different pixel spaces within a same swath.

* * * * *